United States Patent Office 3,061,637
Patented Oct. 30, 1962

3,061,637
CONVERSION OF AMMONIUM CARBAMATES TO ALKALI METAL CARBAMATES
Thomas W. Martinek, Crystal Lake, Ill., assignor to The Pure Oil Company, Chicago, Ill., a corporation of Ohio
No Drawing. Filed Dec. 8, 1958, Ser. No. 778,582
10 Claims. (Cl. 260—500)

This invention is directed to a new and improved method for the preparation of alkali metal N-substituted carbamates and thiocarbamates by reaction of an alkali metal with an ammonium or substituted ammonium N-substituted carbamate or thiocarbamate in an inert organic liquid.

In my copending application Serial No. 762,281, filed September 22, 1958, now Patent No. 2,957,826, I have described the preparation of greases which consist of mineral oil or other lubricating oil thickened with metal N-substituted carbamates, and process of preparing such greases. The metal N-substituted thiocarbamates are well-known corrosion inhibitors. The metal N-substituted carbamates, however, are not reported in the literature and apparently have never been prepared in pure form.

It is therefore one object of this invention to provide an improved process for the preparation of alkali metal N-substituted carbamate and thiocarbamate salts.

A feature of this invention is the provision of a process wherein an ammonium or substituted ammonium N-substituted carbamate or thiocarbamate salt is reacted with a dispersion of an alkali metal in an inert organic liquid to produce the alkali metal N-substituted carbamate or thiocarbamate in very high yield and high purity.

Other objects and features of this invention will become apparent from time to time throughout the specification and claims as hereinafter related.

This invention is based upon my discovery that ammonium or substituted ammonium carbamates or thiocarbamates of the formula $R'_4NCX_2NR_2$, where R is of the group consisting of hydrogen and $C_1$–$C_{30}$ alkyl and aralkyl radicals, not more than one R being hydrogen, and R' is of the group consisting of hydrogen and $C_1$–$C_{30}$ alkyl and aralkyl radicals, at least one R' being hydrogen, will react with alkali metals, such as sodium, potassium, lithium, cesium, rubidium, or francium, or mixtures thereof, in dispersion in an inert organic liquid to produce the alkali metal carbamate or thiocarbamate by displacement of hydrogen and an amine (or ammonia) from the ammonium or substituted ammonium N-substituted carbamate or thiocarbamate salt.

In carrying out this invention, the ammonium or substituted ammonium N-substituted carbamate or thiocarbamate salts may be prepared by any conventional process. For example, ammonia will react with carbon dioxide or carbon disulfide to produce ammonium carbamate or ammonium thiocarbamate. The ammonium carbamate or thiocarbamate may be reacted with an olefin to produce an ammonium or substituted ammonium N-substituted carbamate or thiocarbamate wherein the olefin is added to the hydrogen atoms of the salt. Similarly, primary and secondary amines react with carbon dioxide or carbon disulfide to form substituted ammonium N-substituted carbamates or thiocarbamates which may be used in this reaction. The ammonium or substituted ammonium N-substituted carbamate or thiocarbamate salts may also be prepared by reaction of N-substituted carbamic acids or N-substituted thiocarbamic acids with ammonia or primary, secondary, or tertiary amines. In the reaction of amines with carbon dioxide or carbon disulfide any primary or secondary $C_1$–$C_{30}$ alkyl or arylalkyl amine may be used. Aromatic amines, such as aniline, do not react with carbon dioxide or carbon disulfide to form the N-substituted carbamate salts. Amines which may be used in the preparation of the substituted ammonium substituted carbamate salts include methyl amine, dimethyl amine, ethyl amine, diethyl amine, methylethyl amine, methylpropyl amine, butyl amine, dibutyl amine, hexyl amine, dihexyl amine, octyl amine, dioctyl amine, dodecyl amine, stearyl amine, tricosyl amine, benzyl amine, phenylethyl amine $$(C_6H_5CH_2NH_2)$$

naphthylmethyl amine $(C_{10}H_7CH_2NH_2)$, etc. These amines react with carbon dioxide or carbon disulfide to form substituted ammonium substituted carbamate or thiocarbamate salts of the formula $R'_4NCX_2NR_2$, where R' is hydrogen or $C_1$–$C_{30}$ alkyl or aralkyl, at least one R' being hydrogen, X is oxygen or sulfur, and R is hydrogen or $C_1$–$C_{30}$ alkyl or aralkyl, not more than one R being hydrogen.

The following non-limiting examples are illustrative of the scope of this invention:

EXAMPLE I

A dispersion of 5.2 g. of sodium and 15.6 g. of 200 vis. neutral oil was prepared by heating a mixture of sodium and neutral oil in an atmosphere of nitrogen until the sodium had melted, followed by stirring at high speed until a fine dispersion was effected. The dispersion was then cooled below the melting point of sodium without stirring. To this dispersion of sodium in neutral oil there were added 20 g. of dimethylammonium dimethylcarbamate, $H_2(CH_3)_2NCO_2N(CH_3)_2$, and agitation of the mixture continued. A mildy exothermic reaction takes place which maintains the reaction mixture at a temperature of about 75° C. Hydrogen is evolved for a period of about 20 minutes at which time reaction is complete. The dispersion sets up into a grease-like gel (which may be used as a lubricating grease) containing approximately 25 g. of sodium dimethylcarbamate, $NaN(CH_3)_2CO_2$. This grease-like gel is dispersed in hexane to precipitate the sodium dimethyl carbamate. The slurry which is formed is filtered and the sodium dimethylcarbamate is rewashed with hexane and finally stripped with nitrogen to yield 24.5 g. of sodium dimethylcarbamate, a white crystalline salt, of about 95% purity.

EXAMPLE II

A dispersion of 5.75 g. of sodium in 15.6 g. of 200 vis. neutral oil is prepared by heating a mixture of sodium and neutral oil in an atmosphere of nitrogen until the sodium has melted, followed by stirring at high speed until a fine dispersion is effected. The dispersion is then cooled below the melting point of sodium without stirring. To this dispersion of sodium in neutral oil, there is added 41.5 g. of dimethylammonium dimethyldithiocarbamate, $$H_2(CH_3)_2NCS_2N(CH_3)_2$$

and 60 g. of 200 vis. neutral oil. A mildy exothermic reaction takes place which maintains the temperature of the reaction mixture at about 75° C. During the period of reaction, hydrogen is evolved continuously from the mixture. At the end about 20 minutes, hydrogen evolution ceases, and the mixture has formed a semi-fluid gelatinous product. This product is then diluted with benzene to precipitate sodium dimethyldithiocarbamate and filtered to recover the product. The product is rewashed with benzene, refiltered, and finally stripped with nitrogen to yield 35 g. of sodium dimethyldithiocarbamate. The yield of sodium dimethyldithiocarbamate is about 95% of the pure salt, of about 98% purity.

In a series of additional runs, other substituted ammonium N-substituted carbamates and thiocarbamates are reacted with dispersions of sodium, potassium, and lithium in various inert organic liquids as reaction media to produce the desired sodium, potassium, or lithium N-substituted carbamate or thiocarbamate salts. The carbamates and metals which are used as reactants in these experiments, the temperature each experiment, the reaction medium, and the product salt are all set forth in Table I, as follows:

*Table I*

*$R'_4NCX_2NR_2 + M \rightarrow NR_2CX_2M + H_2 + NR'_3$*

| Example No. | $R_4NCX_2NR_3$ | M | Temp., °C. | Reaction Medium | Product |
|---|---|---|---|---|---|
| 1 | $H_2(CH_3)_2NCO_2N(CH_3)_2$ | Na | 75 | 200 vis. Neutral Oil | $N(CH_3)_2CO_2Na$. |
| 2 | $H_2(CH_3)_2NCS_2N(CH_3)_2$ | Na | 75 | do | $N(CH_3)_2CS_2Na$. |
| 3 | $H_4NCO_2N(CH_3)_2$ | Na | 60 | do | $N(CH_3)_2CO_2Na$. |
| 4 | $H_3C_2H_5NCO_2NHC_2H_5$ | Na | 75 | Hexane | $NHC_2H_5CO_2Na$. |
| 5 | $H_2(C_2H_5)_2NCO_2NHCH_3$ | Na | 75 | do | $NHCH_3CO_2Na$. |
| 6 | $H_3C_4H_9NCO_2NHC_4H_9$ | K | 100 | Toluene | $NHC_4H_9CO_2K$. |
| 7 | $H_3C_4H_9NCO_2NHC_4H_9$ | Li | 100 | 200 vis. Neutral Oil | $NHC_4H_9CO_2Li$. |
| 8 | $H_2(CH_3)_2NCO_2N(CH_3)_2$ | Na | 25 | Tetrahydrofuran | $N(CH_3)_2CO_2Na$. |
| 9 | $H_3C_6H_{13}NCO_2NHC_6H_{13}$ | Na | 25 | Benzene | $NHC_6H_{13}CO_2Na$. |
| 10 | $H_3C_6H_{13}NCO_2NHC_6H_{13}$ | Li | 50 | 200 vis. Neutral Oil | $NHC_6H_{13}CO_2Li$. |
| 11 | $H_3C_{18}H_{37}NCO_2NHC_{18}H_{37}$ | Na | 125 | do | $NHC_{18}H_{37}CO_2Na$. |
| 12 | $H_3C_9H_{19}NCO_2NHC_9H_{19}$ | Li | 125 | do | $NHC_9H_{19}CO_2Li$. |
| 13 | $H_3C_6H_5CH_2NCO_2NHC_6H_5CH_2$ | Na | 75 | do | $NHC_6H_5CH_2CO_2Na$. |

\* M is an alkali metal, R is hydrogen or $C_1$–$C_{30}$ alkyl or aralkyl, not more than one R being hydrogen, and R' is hydrogen or $C_1$–$C_{30}$ alkyl or aralkyl, at least one R' being hydrogen.

The potassium dispersion which is used in Example 6 of Table I is prepared by heating potassium metal in toluene to a temperature just above the melting point of potassium, accompanied by vigorous agitation using a high-speed stirrer. The N-n-butyl ammonium N-n-butyl carbamate is added to the dispersion of potassium in toluene with continued agitation. The lithium dispersions are more difficult to prepare and in all cases must be prepared in high-boiling liquids, such as mineral oil. The preparation of the lithium dispersion requires that lithium metal and the mineral oil (or other high-boiling liquid) be heated to a temperature above the melting point of lithium and subjected to considerable agitation with a high-speed stirrer. A lithium dispersion tends to settle very rapidly and so the substituted ammonium N-substituted carbamates or thiocarbamates must be added to the dispersion while maintaining continuous agitation with a high-speed stirrer. In Examples 4–6, 8, and 9 the product salt is recovered directly by evaporation of the organic liquid. In each of the various examples, the alkali metal displaces the substituted ammonium portion of the N-substituted carbamate salt to yield the alkali metal salt, evolved hydrogen, and ammonia or the displaced amine. In the case of the lower-molecular-weight amines, separation is effected by stripping or by distillation, while the high-boiling amines, e.g., stearylamine, is separated by solvent extraction.

In this process the reaction may be carried out using any alkali metal and any ammonium or N-substituted ammonium N-substituted carbamate or thiocarbamate as above described. The reaction may be carried out in any inert organic liquid, i.e., any organic liquid which is unreactive and thermally stable under the conditions of the process. The pressure of the process is not critical and is usually atmospheric, although subatmospheric and superatmospheric pressures may be used where appropriate. The reaction temperature is not critical and may vary from 0° to 200° C. or higher provided that the decomposition temperature of the reactants or products is not exceeded.

While I have described my invention fully and completely, as required by the patent statutes, with special emphasis upon several preferred embodiments thereof, I wish it to be understood that within the scope of the appended claims this invention may be practiced otherwise than as specifically described herein.

What is claimed is:

1. A method of preparing substituted carbamate salts of the formula $R_2NCX_2M$, where M is an alkali metal, X is a member of the group consisting of oxygen and sulfur, and R is a member of the group consisting of hydrogen and $C_1$–$C_{30}$ alkyl and aralkyl radicals, not more than one R being hydrogen, which comprises reacting a substituted ammonium carbamate salt of the formula $R'_4NCX_2NR_2$, where R and X are as previously defined, and R' is a member of the group consisting of hydrogen and $C_1$–$C_{30}$ alkyl and aralkyl radicals, at least one R' being hydrogen, with a dispersion of an alkali metal in an organic liquid which is thermally stable and inert under the conditions of the reaction, at a temperature of about 0°–200° C., which is not in excess of the decomposition temperature of either the reactants or the products, and recovering the product salt.

2. A method in accordance with claim 1 in which the organic liquid is selected from the group consisting of mineral oil, hexane, benzene, toluene, and tetrahydrofuran.

3. A method in accordance with claim 2 in which X is oxygen.

4. A method in accordance with claim 2 in which the organic liquid is volatile and the product is recovered by evaporation of said liquid.

5. A method in accordance with claim 2 in which the organic liquid is non-volatile, and the product is recovered by washing with a volatile solvent followed by stripping the solvent from the product.

6. A method in accordance with claim 2 in which M is sodium.

7. A method in accordance with claim 2 in which M is potassium.

8. A method in accordance with claim 2 in which M is lithium.

9. A method in accordance with claim 2 in which a sodium dispersion in a hydrocarbon is reacted with dimethylammonium dimethylcarbamate and sodium dimethylcarbamate is recovered as the product.

10. A method in accordance with claim 2 in which finely divided lithium is reacted with n-hexylammonium n-hexylcarbamate in hexane and lithium n-hexylcarbamate is recovered as the product.

References Cited in the file of this patent

Franklin, "The Nitrogen System of Compounds," page 27 (1947). (Copy in Pat. Off. Sci. Lib.)